United States Patent
Yamamura

[11] Patent Number: 6,116,288
[45] Date of Patent: Sep. 12, 2000

[54] AIR INTAKE DUCT

[75] Inventor: Michio Yamamura, Kobe, Japan

[73] Assignee: Tigers Polymer Corporation, Toyonaka, Japan

[21] Appl. No.: 09/300,917

[22] Filed: Apr. 28, 1999

[51] Int. Cl.⁷ .......................... F16L 11/112; B29C 1/165
[52] U.S. Cl. .......................... 138/118; 138/121; 138/173; 156/245
[58] Field of Search .................................. 138/121, 122, 138/173, 118; 156/245, 242

[56] References Cited

U.S. PATENT DOCUMENTS

| | | | |
|---|---|---|---|
| 3,050,087 | 8/1962 | Caplan | 138/121 |
| 3,076,737 | 2/1963 | Roberts | 138/121 X |
| 3,626,988 | 12/1971 | Chu | 138/121 |
| 3,737,353 | 6/1973 | Gilbu | 138/121 X |
| 4,415,185 | 11/1983 | Vinciguerra et al. | 138/121 X |
| 5,720,656 | 2/1998 | Savage | 138/121 X |

FOREIGN PATENT DOCUMENTS

| | | | |
|---|---|---|---|
| 1346924 | 11/1963 | France | 138/121 |
| 5-8167 | 2/1993 | Japan . | |
| 5-59233 | 3/1993 | Japan . | |
| 7-310869 | 11/1995 | Japan . | |

*Primary Examiner*—Patrick Brinson
*Attorney, Agent, or Firm*—Burns, Doane, Swecker & Mathis, LLP

[57] ABSTRACT

An air intake duct comprising a main body with bellows which is made by blow molding soft resin and ring-like reinforcements made of hard resin. As the soft resin, a material which is capable of keeping a form of a tube by itself is adopted. The reinforcements are previously mounted on the internal surface of a blow molding die and unite with the bellows in the main body in blow molding.

6 Claims, 3 Drawing Sheets

AIR INTAKE DUCT

BACKGROUND OF THE INVENTION

1. Field of the Invention

The present invention relates to an air intake duct, more particularly to an air intake duct for supplying air for a car engine.

2. Description of Related Art

Generally, air intake ducts for car engines use rubber or soft resin as material in order to meet the demand for light weight, vibration isolation and flexibility, and for more flexibility, bellows are formed partly in them. However, this kind of air intake ducts are inclined to be deformed inward by large negative pressure and cause problems like low engine power.

Therefore, reinforcements are conventionally arranged inside or outside around the duct. For example, Japanese utility-model laid-open publication 5-8167 discloses mounting metallic reinforcing rings on an internal surface of a duct with their spring. Also, Japanese patent laid-open publication No. 7-310869 discloses arranging plural protrusions sticking out of peaks of bellows, onto which reinforcing rings are mounted.

However, for both air intake ducts as mentioned above, it is necessary to mount by hand work reinforcing rings around inside or outside of the duct which is already molded, and the process is complicated.

SUMMARY OF THE INVENTION

Therefore, an object of the present invention is to provide an air intake duct which is provided with reinforcements to prevent deformation by negative pressure, and which is easy to construct since hand work of mounting the reinforcements in a main body of the duct is not necessary.

In order to achieve the object, an air intake duct according to the present invention has the following characteristics. The air intake duct comprises a main body which has bellows and is made by blow molding soft resin, and ring-like reinforcements made of hard resin. The reinforcements are previously mounted on an internal surface of a blow molding die and unite with the bellows in the main body in blow molding.

In the present invention, the bellows in the main body are reinforced by the ring-like reinforcements with the flexibility remaining and free from deformation by large negative pressure, and problems like low engine power can be prevented. Further, the reinforcements are previously inserted in the blow molding die and unite with the bellows in the main body in blow molding, thereby saving a complicated process of mounting reinforcements by hand in the main body which has been already molded.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENT

An embodiment of an air intake duct according to the present invention is hereinafter described with reference to the accompanying drawings.

Figure 1:
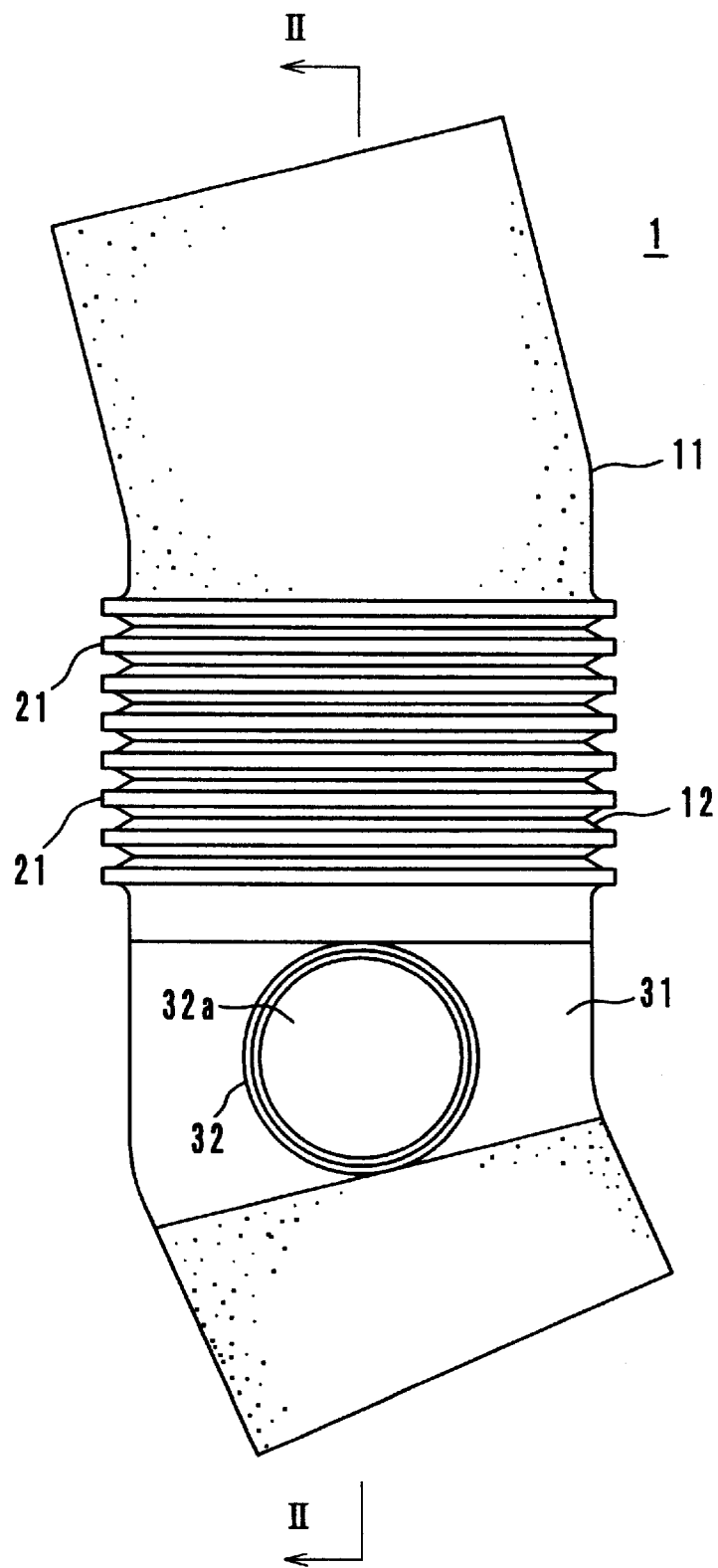
FIG. 1 is a plan view of an air intake duct as an embodiment of the present invention.
Figure 2:
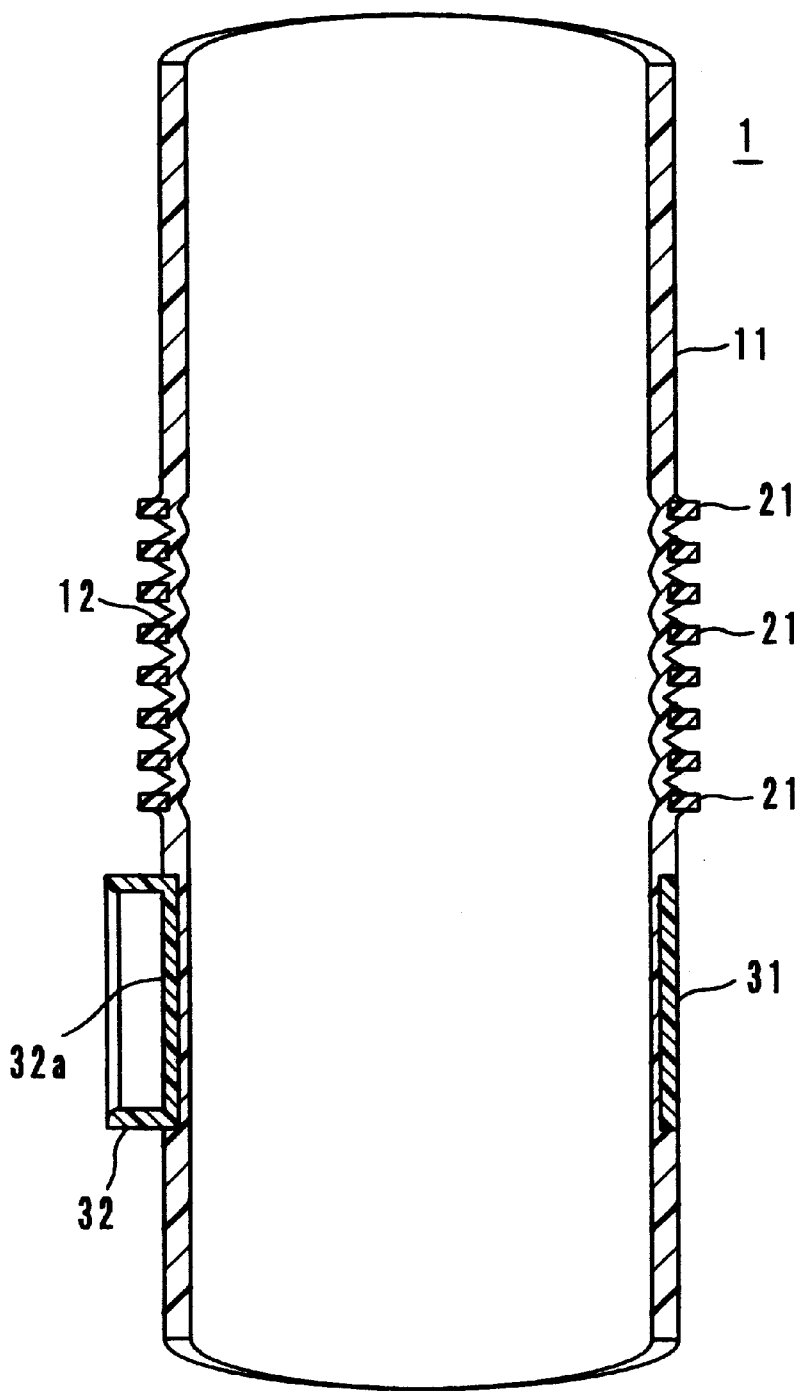
FIG. 2 is a cross section taken along the line II—II of FIG. 1.

FIGS. 1 and 2 show an air intake duct 1 as an embodiment of the present invention which comprises a main body 11 provided with bellows 12, ring-like reinforcements 21 and a connecting tube 31.

The main body 11 is made by blow molding soft resin, for example, olefin thermo plastic elastomer, and is provided with the bellows 12. The reinforcements 21 are made by injection molding hard resin, for example, hard polypropylene resin, and are secured uniting with peaks of the bellows 12 in the main body 11. The connecting tube 31 is made by injection molding the same hard resin as the reinforcements 21, for example, hard polypropylene resin, and is provided with a circular connection 32.

Figure 3:
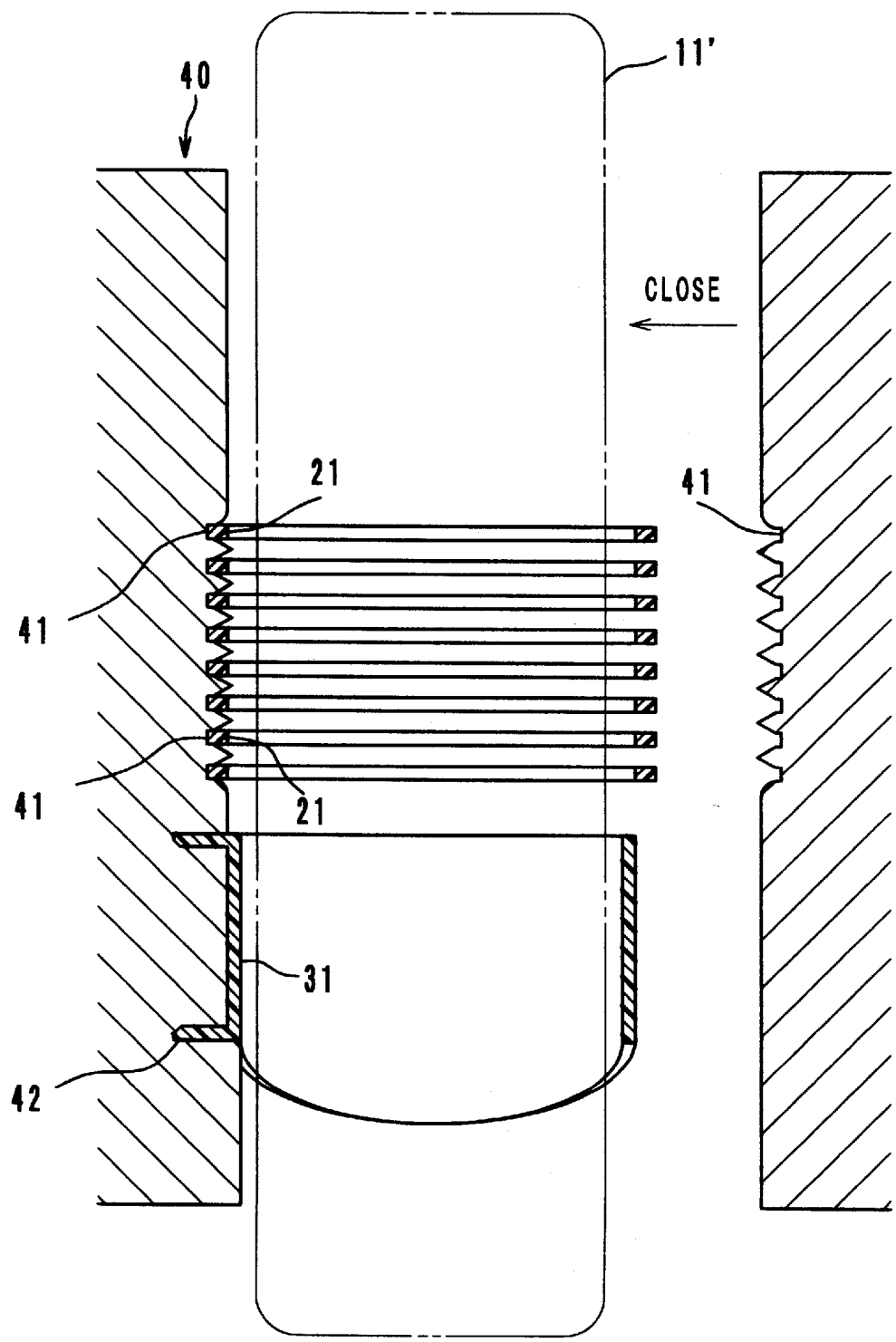
FIG. 3 is a cross section which shows a blow molding die with reinforcements and a connecting tube inserted.

The blow molding die 40 is split into two. As shown in FIG. 3, the reinforcements 21 and the connecting tube 31 are mounted previously on an internal surface of one of the parts of the die 40, and the die 40 is closed. Thus, they are held in the die 40. Then, a parison 11' which is made of olefin thermo plastic elastomer is inserted into the die 40, and compressed gas is injected into the parison 11'. In this way, the main body 11' is blow molded.

Recesses 41 and 42 are formed in the internal surface of the die 40 for the reinforcements 21 and connecting tube 31 to fit in. In blow molding the parison 11' into the main body 11, the reinforcements 21 and the connecting tube 31 adhere and unite with the main body 11.

After blow molding, both ends of the main body 11 removed out of the die 40 are closed like a bag, while FIGS. 1 and 2 show the one whose both ends are cut open. Also, a wall 32a of the connection 32 in the connecting tube 31 will be cut off later.

As described above, in the embodiment, the main body 11 is made of soft resin with vibration isolation and flexibility in itself which are desirable properties for an air intake duct of a car engine. Also, the main body 11 is free from deformation under large negative pressure since the bellows 12 are reinforced by the reinforcements 21 which are made of hard resin. Further, the reinforcements 21 are previously inserted in the die 40 and unite with the main body 11 in blow molding, and thereby, a complicated process of mounting reinforcements by hand after blow molding is not necessary.

Although the present invention has been described in connection with the embodiment, it is to be noted that various changes and modifications are possible to those who are skilled in the art. Such changes and modifications are to be understood as being within the scope of the present invention.

Especially, various other materials as well as olefin thermo plastic elastomer and hard polypropylene may be adopted for the main body and the reinforcements as long as they meet the objects of their use. The merit of using the above-mentioned two materials is that they adhere well to each other.

Also, the reinforcements are not necessarily to be complete rings. They may be half rings which are inserted into the two parts of the blow molding die to be made into rings by clamping. Further, the reinforcements may be mounted alternately or mounted on roots of the bellows.

What is claimed is:

1. An air intake duct comprising:
   a main body with bellows, the main body made by blow molding a soft resin that is capable of keeping a tube form by itself;
   ring-like reinforcements made of hard resin, the reinforcements being previously mounted on an internal surface of a blow molding die and united with the bellows in the main body in blow molding.

2. An air intake duct as claimed in claim 1, wherein the main body is made of an olefin thermo plastic elastomer.

3. An air intake duct as claimed in claim 1, wherein the reinforcements are made of a hard polypropylene resin.

4. A method of making an air duct, the method comprising:

mounting ring-like reinforcements to an internal surface of a blow molding die, the ring-like reinforcements being made of a hard resin;

blow molding a soft resin in the blow molding die to form a main body including bellows, the soft resin being capable of keeping a tube form by itself; and uniting the ring-like reinforcements with the bellows in the main body during blow molding.

5. The method of claim 4, wherein in the blow molding step, the soft resin is an olefin thermo plastic elastomer.

6. The method of claim 4, wherein in the mounting step, the hard resin is a hard polypropylene resin.

\* \* \* \* \*